(12) United States Patent
Levy et al.

(10) Patent No.: US 7,044,614 B2
(45) Date of Patent: May 16, 2006

(54) FUNCTIONAL APPLICATION OF PHOTOCHROMIC COMPOUND MATERIALS TO PRODUCTS

(75) Inventors: Rami C. Levy, Plantation, FL (US); Robert C. Gray, Deerfield Beach, FL (US); Ryan M. Nilsen, Pompano, FL (US)

(73) Assignee: Motorola, Inc., Schaumburg, IL (US)

( * ) Notice: Subject to any disclaimer, the term of this patent is extended or adjusted under 35 U.S.C. 154(b) by 316 days.

(21) Appl. No.: 10/666,708

(22) Filed: Sep. 18, 2003

(65) Prior Publication Data

US 2005/0063199 A1    Mar. 24, 2005

(51) Int. Cl.
*F21V 9/00* (2006.01)
*F21V 131/30* (2006.01)

(52) U.S. Cl. .................. 362/84; 40/543; 250/483.1; 362/109; 362/253; 362/806; 362/362; 362/34

(58) Field of Classification Search .............. 40/543; 362/84, 109, 119, 253, 800, 806, 362, 34; 250/483.1

See application file for complete search history.

(56) References Cited

U.S. PATENT DOCUMENTS

| | | | |
|---|---|---|---|
| 6,514,460 B1 * | 2/2003 | Fendrock | 422/55 |
| 6,555,028 B1 | 4/2003 | Walters et al. | |
| 6,860,616 B1 * | 3/2005 | Yu et al. | 362/118 |
| 6,942,362 B1 * | 9/2005 | Deutsch et al. | 362/253 |
| 2003/0210780 A1 * | 11/2003 | Pratt et al. | |
| 2004/0062038 A1 * | 4/2004 | Donovan | |
| 2004/0136180 A1 * | 7/2004 | Lewis et al. | |

* cited by examiner

*Primary Examiner*—Laura K. Tso

(57) ABSTRACT

A device (50) capable of selectively altering its appearance can include a housing portion (64) of the device having at least one photochromic compound and an ultraviolet light source (60) forming a portion of the device for exposing the portion of the device having the photochromic compound to the ultraviolet light source. A reaction by the photochromic compound can provide or serve as a status indicator for the device. The device can be any number of devices such as a portable communication device, a personal digital assistant, a laptop computer, a camera, a GPS device, a printer, a camcorder, a vehicle, a toy, a personal hygiene device, a watch, a calculator, and a writing instrument for example. The device can be formed so that reactions by the photochromic compounds within the device are controlled solely by the ultraviolet light sources (54 and 60) within the device.

23 Claims, 4 Drawing Sheets

FUNCTIONAL APPLICATION OF PHOTOCHROMIC COMPOUND MATERIALS TO PRODUCTS

CROSS-REFERENCE TO RELATED APPLICATIONS

Not applicable

1. Field of the Invention

This invention relates generally to the use of photochromic compound materials, and more particularly to the functional uses of photochromic materials on products.

2. Background of the Invention

Photochromic compound (also known as polymeric matrix compounds) technology has been applied to numerous opaque products as well as to optically clear articles such as contact lenses, sunglasses, or other plastic transparencies. One known brand of photochromic compound is called Spectrachrome®. U.S. Pat. No. 6,555,028 discusses the chemical aspects of polymeric matrix compounds. When exposed to electromagnetic radiation containing ultraviolet (UV) rays, such as the ultraviolet radiation in sunlight or the light of a mercury lamp, many photochromic compounds exhibit a reversible change in color. When the ultraviolet radiation is discontinued, such a photochromic compound will return to its original color or colorless state.

Many of the known applications for photochromic compound impart aesthetic enhancements to products rather than functional enhancements. A variety of colors are available, and generally they remain clear until exposed to UV rays. Several companies provide photochromic materials in various forms including powder form, microencapsulated form, and master batch form (ready to inject into plastics). Photochromic compounds are also available in raw form and can be applied to products in several ways. The simplest way is to use an airbrush, followed by application of a protective, clear coating. Existing commercial uses such as in sunglass frames and frisbees use a dye form of photochromic compounds embedded or injected into the plastic material of the product. Other companies have created photochromic contact lenses and sunglass lenses. Yet, none of these uses appear to provide additional functionality beyond aesthetic functions nor are these functions selective by a user.

SUMMARY OF THE INVENTION

A number of applications of photochromic compound technology can impart functional improvements to many devices. For example, highlighting the buttons on a keypad or on another portion of the device or coating a display's background or a lens can improve the readability of the display on a device. Additional functional applications could provide camouflage by causing a color change due to UV exposure that matches (or obscures) another color on the display or elsewhere, visually obstructing it from view. Further embodiments on this idea can be implemented using active (user- or device-controlled) UV exposure of the photochromic compound material, thereby enabling the device to control its own color shifts.

In a first embodiment in accordance with the present invention, a method of selectively altering the appearance of a device having at least one photochromic compound can include the steps of energizing an ultraviolet light source forming a portion of the device and exposing at least a portion of the device having the at least one photochromic compound to the ultraviolet light source. The UV source can be a UV light emitting diode (LED), a mercury lamp or any other UV light source. The method could further include the step of varying an apparent intensity of the ultraviolet light source incident upon the portion of the device having the at least one photochromic compound. It should be understood that the device can include more than one photochromic compound that reacts differently to the same UV lightsource (changes to different colors). Furthermore, the device can include more than one photochromic compound that reacts differently to different UV light sources.

In a second embodiment, a device capable of selectively altering its appearance can include a housing portion of the device having at least one photochromic compound and an ultraviolet light source forming a portion of the device for exposing at least a portion of the device having the at least one photochromic compound to the ultraviolet light source. A reaction by the photochromic compound can provide or serve as a status indicator for the device. The device can be any number of devices such as a portable communication device, a personal digital assistant, a laptop computer, a camera, a global positioning device, a printer, a camcorder, a vehicle, a toy, a personal hygiene device, a watch, a calculator, and a writing instrument just to name a few. The device can also be arranged and constructed so that reactions by the photochromic compounds within the device are controlled solely by the ultraviolet light sources within the device.

In a third embodiment, a device capable of altering its appearance, can include a housing portion of the device having at least one photochromic compound and at least one photovoltaic cell within the housing portion so that the housing portion having the photochromic compound allows an external source of light to energize the photovoltaic cell through the housing portion.

In a fourth embodiment an electronic device can include a housing, a display lens and a plurality of buttons within apertures of the housing, and at least one photochromic compound on at least one among the housing, the display lens and the plurality of buttons, wherein exposure to ultraviolet light causes the at least one photochromic compound to change color.

In yet another embodiment, a writing instrument can include a housing; and an ink cartridge within the housing wherein the ink cartridge within the housing comprises a photochromic compound that changes colors when exposed to ultraviolet light.

DETAILED DESCRIPTION OF THE DRAWINGS

Figure 1:
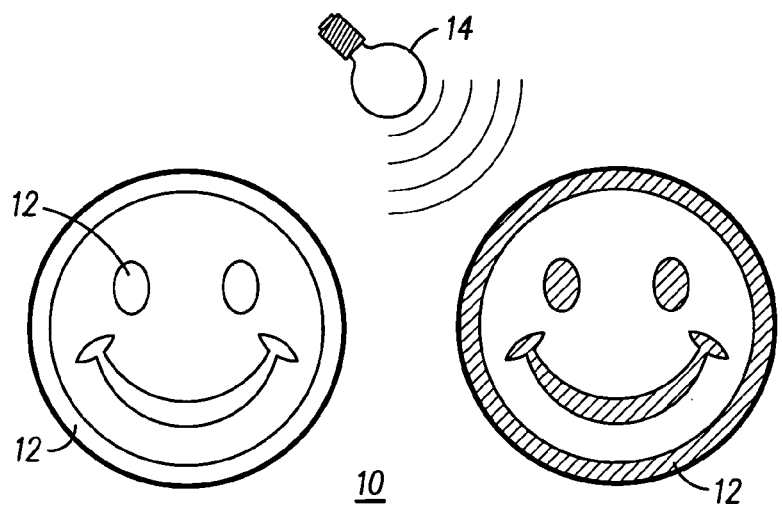
FIG. 1 is an illustration of an existing passive use of photochromic compounds on products.

Referring to FIG. 1, there is shown an existing consumer item such as a Frisbee or flying disk 10 having at least a portion 12 of the disk embedded with a photochromic compound that enables the portion 12 to change to a different color (represented by the shading) when exposed to an UV light source 14 such as the sun. The color changes as merely aesthetic in purpose.

Figure 2:
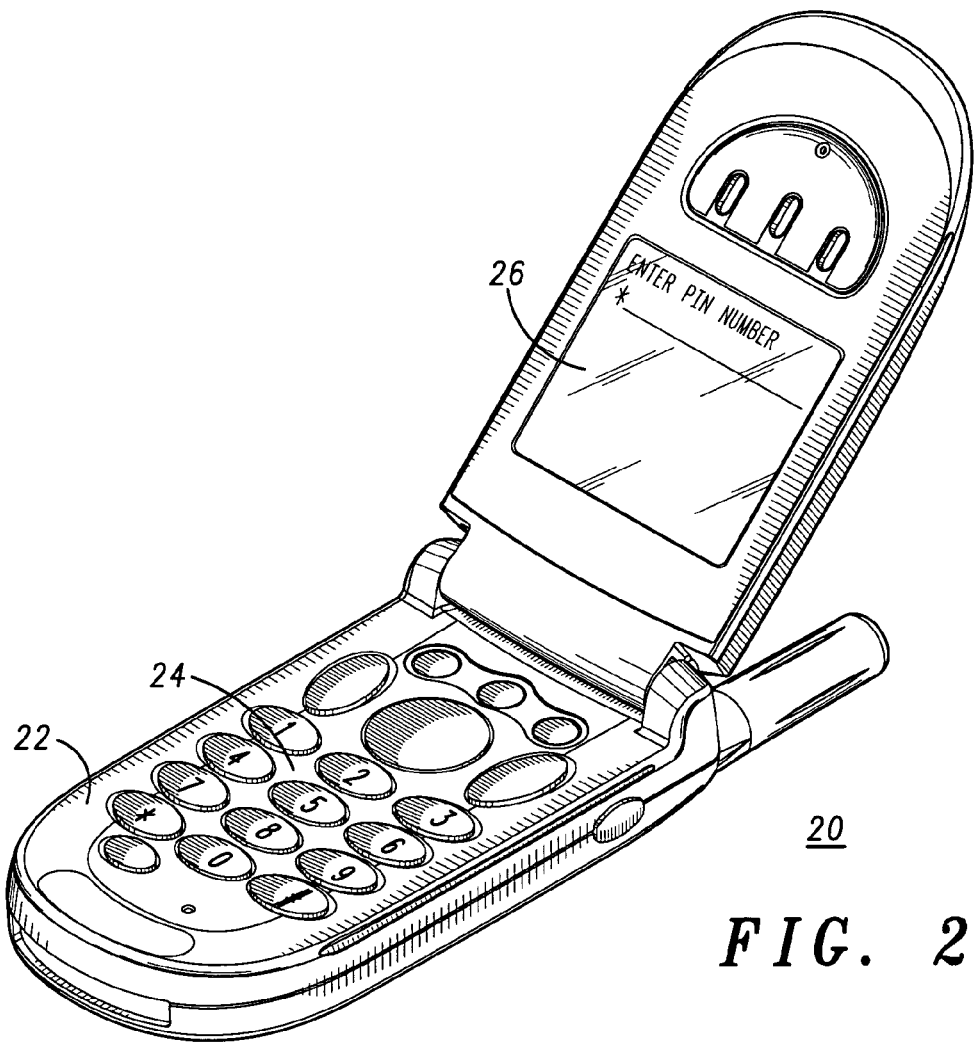
FIG. 2 is an illustration of a device having a UV light source and using photochromic compounds in accordance with the present invention.

Referring to FIG. 2, a device such a portable communication radio 20 is shown. The radio 20 can have a housing 22 with photochromic compound on or embedded within the housing. The housing 22 can be made of various types of plastic or other materials. In this particular embodiment, the radio 20 further comprises an internal UV light source 24 such as UV-LEDs. The UV light source 24 would be considered an active source as opposed to a passive source of UV light such as the sun. The radio can also include a display 26 such as a liquid crystal display (LCD) that can also have photochromic compound on a lens of the display or on a background of the display.

Figure 3:
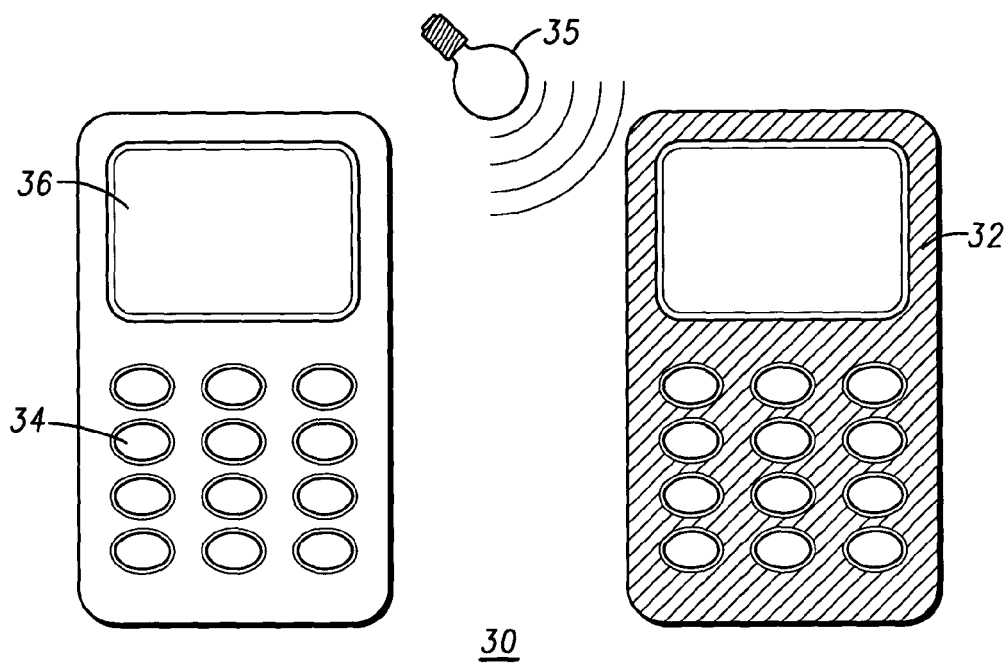
FIG. 3 is an illustration of a device housing having photochromic compounds in accordance with the present invention.

Referring to FIG. 3, a housing or face plate 32 for a device 30 such a cellular phone, calculator, personal digital assistant or any number of other devices is shown. The housing 32 can include any number of apertures such as apertures 34 for keypads or an aperture 36 for a display. The housing 32 can have a clear color when out of the light and then a darker or more opaque color when exposed to a UV light source 35. For example, a clear housing can have a coating outside of the device housing with photochromic material that remains clear in its unexposed state, and turns into a particular color (or a number of colors, using different dyes) when exposed to UV. Note also that the entire surface of the device does not have to be coated. Instead, only a certain portion could be coated (keypad, battery cover, a portion of a keypad or housing, etc.)

Figure 4:
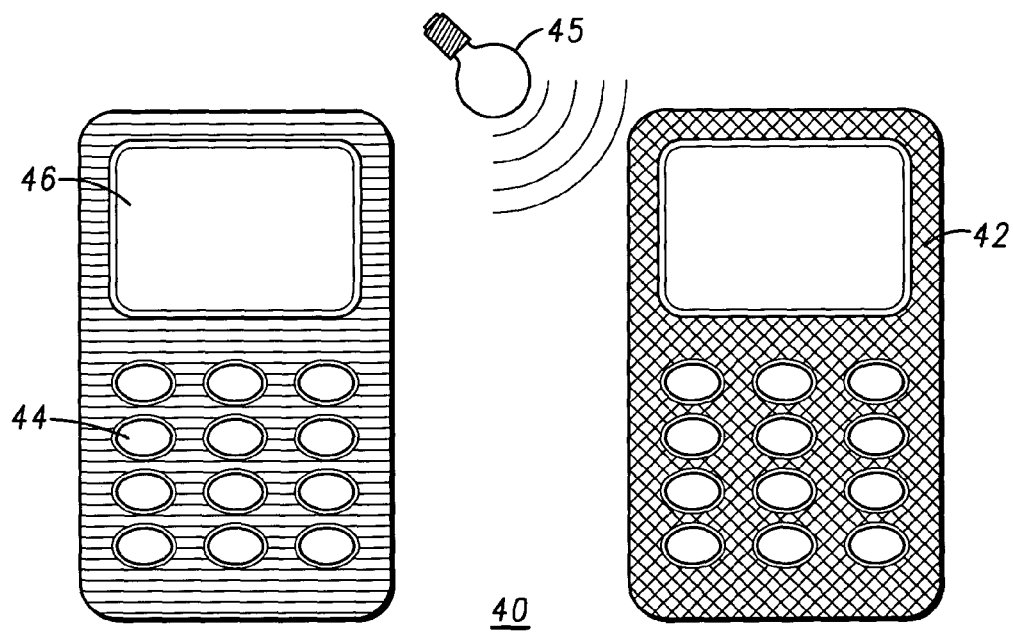
FIG. 4 is another illustration of a device housing having photochromic compounds in accordance with the present invention.

Similarly, in FIG. 4, a housing 42 for a device 40 can include any number of apertures such as apertures 44 for keypads or an aperture 46 for a display. The housing 42 can have a first color when not exposed to UV light (represented by the horizontal shading) and then a different color (represented by the diagonal shading) when exposed to a UV light source 45. For example, a coating outside of device housing with photochromic dye can be applied such that the device remains in a first color in its unexposed state, and turns into a different color (or a number of colors, using different dyes) when exposed to UV.

Although the housings 32 and 42 utilize passive sources, the changes in color are quite functional in nature. For example, the color differences between the housing (substrate) and the dye in its various states can be used to camouflage (visually hide) certain parts of the device. For example, certain buttons or an area of the housing with a logo can be visually hidden when exposed to UV light. The color differences between the housing (substrate) and the dye in its various states can also be used to enhance visibility (increase the contrast) of certain parts of the device. For example, certain buttons or an area of the housing with a logo can alternatively be highlighted. Furthermore, use of photochromic compounds on LCD displays and backlights can also be used to affect display color and visibility when the device is in bright sunlight.

When these products use a passive source of light, several advantages become apparent over products that use changeable face plates. For example, since the photochromic material is added during production of the product and not by the consumer, no additional material is added by the consumer to change the appearance and no additional inventory needs to be carried by the manufacturer or vendor. Furthermore, the consumer does not need to switch, remove or otherwise assemble and disassemble faceplates. The reduction is parts naturally reduces warranty and repair costs due to broken faceplates and worn attachment points. Finally, no additional power is required from the device to change colors. Of course, a disadvantage of passive sources is that color changes only occur when the device is exposed to UV, not selectively at any time the user wishes.

Figure 5:
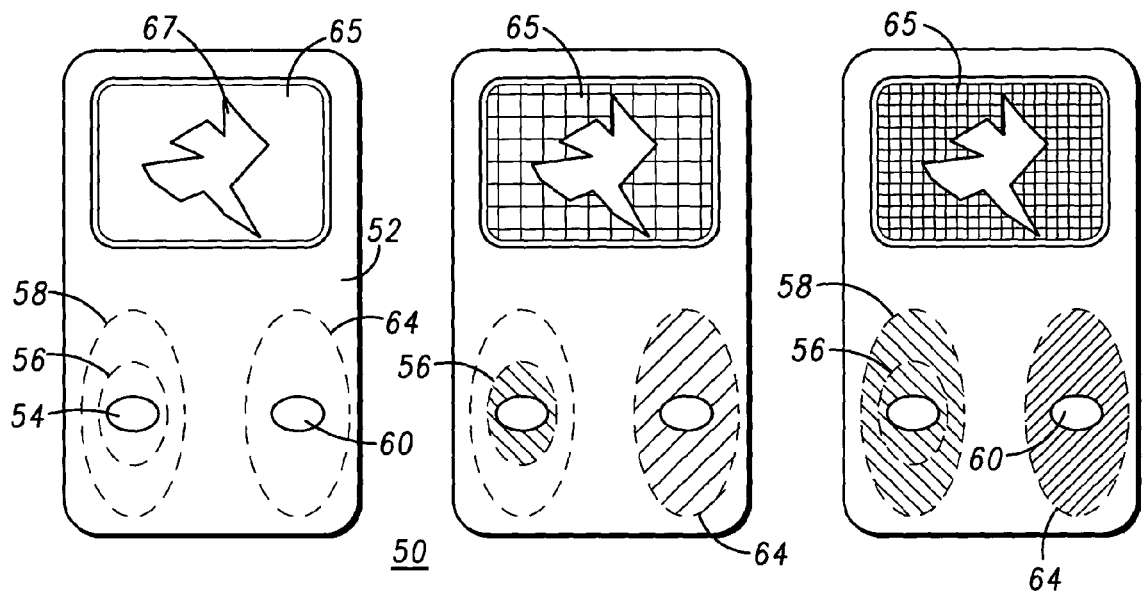
FIG. 5 is an illustration of a device having photochromic compounds in accordance with the present invention.
Figure 6:
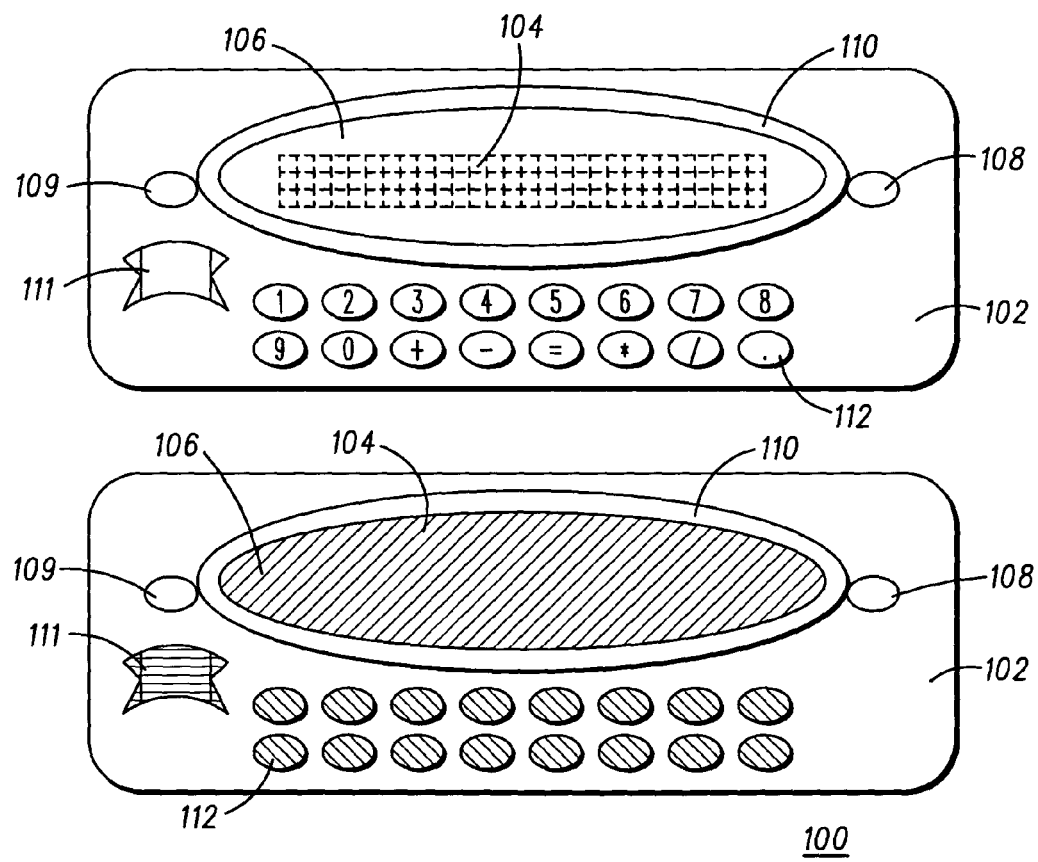
FIG. 6 is another illustration of a device having photochromic compounds in accordance with the present invention.

Referring to FIGS. 5 and 6, devices such as a portable communication radios or other electronic devices having a photochromic compound and an active source of UV lighting are shown. Device 50 of FIG. 6 includes a housing 52 having areas 56, 58 and 64 coated with photochromic compound. Device 50 further includes a display 65 and UV-LEDs 54 and 60 within the housing 52 although the invention is not limited to having active sources necessarily within the housing. The device 100 of FIG. 6, in addition to having a housing selectively coated or embedded with photochromic compound, a display 106 and UV LEDs 108 and 109, the device 100 further optionally includes a way of piping the UV energy through a lightpipe 110. The UV energy can be made to illuminate the photochromic coating on the inside, outside, or within the device housing substrate. Implementing in this manner enables color changes to occur at the user's discretion, or based on predefined events in software. These embodiments would generally require additional software and material (LEDs or other UV sources) and the powering of those UV sources by the unit's power source, which impacts battery life to a degree.

The method of application of the UV LEDs should be straightforward to those skilled in the art, as it is quite similar to current methods of embedding regular LEDs in phones. UV LEDs are available in the same packaging options as normal LEDs (surface mount, leaded, etc.). Lightpipes are also in common use in the industry in these types of devices.

As previously mentioned, the inventive concepts claimed herein can be applied to a wide variety of devices such as a portable communication device, a personal digital assistant, a laptop computer, a camera, a global positioning device, a printer, a camcorder, a vehicle, a toy, a personal hygiene device, a watch, a calculator, and a writing instrument to name a few. In this regard, an active source such as the UV LEDs 54 and 60 in device 50 of FIG. 5 along with the photochromic compound on the housing 52 on areas 56, 58, and 64 can serve as a status or level indicator for many purposes. In its simplest form, the area 64 activated by the UV-LED 60 can serve as an indicator. The indicator can provide an indication of numerous factors such as a charge status of a power source for the device, an in/out of range indication, an audio mode of the device (silent/audible), a voice mail waiting indication, a message waiting indication, an active call indication, an identification of a certain person calling, an emergency/priority call indication, a device setting, mode or configuration (weekend, office, etc). Each function could have corresponding indicators and inputs requiring additional hardware and software. For example, identification of a certain person may require caller ID service or a particular mode setting may require knowledge of a location or a time of day using a GPS receiver or other timing devices.

Beside the variation in devices that photochromic compounds can be used on, the colors, patterns and types of UV sources can also vary to provide further versatility. Photochromic material may be able to be modified to react to UV-B, and thus both UV-A and UV-B reactive material can be used to coat any substrate. This opens up the possibility of giving a user a choice of colors. For example, installing both a UV-A and UV-B LED allows illumination of either one (or both) of the dyes, which may be mixed or applied side-by-side. For example, UV-LED 54 can be a UV-A LED operating in a different wavelength band than UV-LED 60 which can be a UV-B LED. Correspondingly, the photochromic compound used in areas 56 and 58 can be customized to react to UV-A while the photochromic compound used in area 64 can be customized to react to UV-B light. Furthermore, areas 56, 58, and 64 can be designed to provide a status indicator that can vary or provide a level indication. For example, the intensity of the color change of the photochromic compound can be varied by varying a duty cycle to vary an apparent intensity of the ultraviolet light source upon the photochromic compound. As shown with area 64, the change in intensity (going from left to right) can be represented by a more intense coloring (represented by closer cross-hatching in area 64). Alternatively, as shown with areas 56 and 58, the change in intensity can be represented by the size of the area affected by the color change. In either case, (depending on the particular device) this could be used to indicate the charge level of a power source, a volume level, a signal strength, a number of missed calls, a number of voicemail messages waiting, a fuel level, a number of messages waiting, an ink level, a memory used level, a memory available, a number of pictures taken, a period of time left, a fuel level, and a distance traveled to name a few examples.

As previously mentioned, the display 65 of device 50 of FIG. 5 can also include photochromic compounds to enhance the visibility of the images or characters in certain instances. As shown, an image 67 on display 65 can be enhanced by having greater contrast with a surrounding area (65) using the techniques previously discussed.

In yet another embodiment, the device 100 of FIG. 6 illustrates the versatility of the application of photochromic compounds. The device 100 is shown exposed to an external or passive UV source in the top figure and then shown exposed to an internal or active UV source in the bottom figure. In this instance, the device 100 includes a housing portion 102 (including area 111 or LCD lens 106) having at least one photochromic compound and at least one light sensor 104 such as a photovoltaic cell within the housing portion. The housing portion 102 (and in particular, lens 106) allows an external source of light to energize the light sensor 104 through the housing portion. The device can further include an internal UV source for selectively changing the color of the housing portion such as UV-LEDs 108, 109 and lightpipe 110. In one embodiment, photochromic material can be applied on the inside surface of a clear housing such as the lens 106 and the housing can be made out of a material that does not pass UV. In other words, the device can be constructed to be immune from external ultraviolet sources so that reactions by the photochromic compounds therein are controlled solely by the ultraviolet light sources within the device. This enables the device to not change colors in sunlight, but only when irradiated by internal UV LEDs (108 and 109). Of course this is dependant on the actual transmissivity of the plastic.

In yet another aspect, device 100 illustrates a plurality of keys or function buttons 112 than can also include photochromic compounds therein. If the device is a multi-mode or multi-function device, it can be designed to have at least one function button or key that has a portion that changes color and further changes function in correspondence with a change in color. In conjunction with this aspect, the light sensor 104 can serve as an external light sensor to enable the corresponding change in function with the change in color. Thus, for example, if the device 100 was a combination calculator and clock radio, the function buttons 112 can serve as the numeric and function keypads for the calculator when exposed to an external UV source and the same function buttons 112 can serve as the function keys for a clock radio (such as a snooze button or radio-station tuning pre-sets) when not exposed to an external UV source. The number of applications are limitless. For example, another embodiment can be a pen that uses photochromic ink than writes in a first color and changes to a second color when exposed to sunlight.

Figure 7:
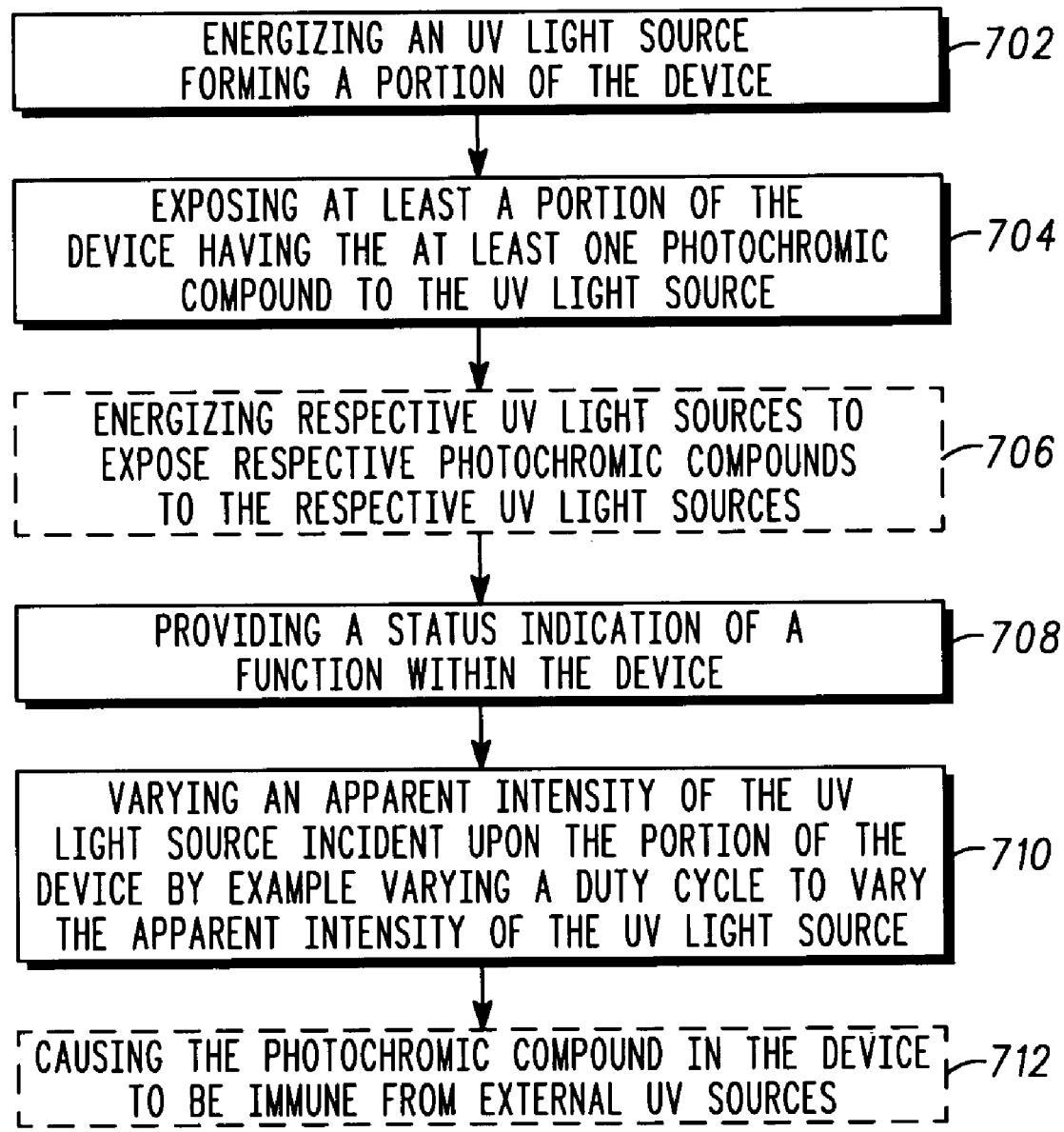
FIG. 7 is a flow chart illustrating a method of selectively altering the appearance of a device using photochromic compounds in accordance with the present invention.

Referring to FIG. 7, a flow chart illustrating a method 700 of selectively altering the appearance of a device having at least one photochromic compound can include the step 702 of energizing an ultraviolet light source forming a portion of the device and the step 704 of exposing at least a portion of the device having the at least one photochromic compound to the ultraviolet light source. The UV source can be a UV light emitting diode (LED), a mercury lamp or any other UV light source. Note that different photochromic compounds can change between different colors and that different wavelength bands of UV light can also affect such compounds differently. Thus, where multiple photochromic compounds and multiple UV light sources are being used, the method can include the optional step 706 of energizing respective UV light sources to expose respective photochromic compounds to the respective UV light sources.

The method can further comprise the step of providing a status indication using the photochromic compound the UV light source at step 708. At step 710, the method could further include the step of varying an apparent intensity of the ultraviolet light source incident upon the portion of the device having the at least one photochromic compound. Optionally, at step 712, the method can further cause the photochromic compound in the device to be immune from an external UV light source.

In light of the foregoing description of the invention, it should be recognized that the present invention can be realized in hardware, software, or a combination of hardware and software. A system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the methods described herein, is suited. A typical combination of hardware and software could be a general purpose computer system with a computer program that, when being loaded and executed, controls the computer system such that it carries out the methods described herein.

Additionally, the description above is intended by way of example only and is not intended to limit the present invention in any way, except as set forth in the following claims.

What is claimed is:

1. A method of selectively altering the appearance of a device having at least one photochromic compound, comprising the steps of:
   energizing an ultraviolet light source forming a portion of the device;
   exposing at least a portion of the device having the at least one photochromic compound to the ultraviolet light source; and causing the photochromic compound in the device to be immune from external ultraviolet sources.

2. The method of claim 1, wherein the step of energizing the ultraviolet light source comprises the step of providing power to an ultraviolet light emitting diode within the device.

3. The method of claim 1, wherein the step of exposing further comprises the step of providing a status indication of a function within the device.

4. The method of claim 1, wherein the method further comprises the step of varying an apparent intensity of the ultraviolet light source incident upon the portion or the device having the at least one photochromic compound.

5. The method of claim 4, wherein the step or varying comprises varying a duty-cycle to vary the apparent intensity of the ultraviolet light source and thereby varying the intensity of the color change.

6. The method claim 1, wherein the device has more than one photochromic compound and more than one ultraviolet light source tailored to cause each respective photochromic compounds to react, wherein the method further comprises energizing respective ultraviolet light sources to expose respective photochromic compounds to the respective ultraviolet light sources.

7. A device capable of selectively altering its appearance, comprising:
a housing portion of the device having at least one photochromic compound; and
an ultraviolet light source forming a portion of the device for exposing at least a portion of the device having the at least one photochromic compound to the ultraviolet light source;
wherein the device is arranged and constructed to have the photochromic compound in the device to be immune from external ultraviolet sources.

8. The device of claim 7, wherein the ultraviolet light source is at least one ultraviolet light emitting diode.

9. The device of claim 8, wherein the at least one ultraviolet light emitting diode comprises at least one UV-A LED and at least one UV-B LED.

10. The device of claim 9, wherein the device comprises a first portion having at least one photochromic compound substantially reactive the at least one UV-A LED and a second portion having at least one photochromic compound substantially reactive to the at least one UV-B LED.

11. The device of claim 7, wherein the ultraviolet light source and a resulting reaction by the at least one photochromic compound provides a status indicator for the device.

12. The device of claim 11, wherein the device is selected from the group comprising a portable communication device, a personal digital assistant, a laptop computer, a camera, a global positioning device, a printer, a camcorder, a vehicle, a toy, a personal hygiene device, a watch, a calculator, and a writing instrument.

13. The device of claim 12, wherein the status indicator provides an indication of at least one among a charge status of a power source for the device, an in/out of range indication, an audio mode of device (silent/audible), a voice mail waiting indication, a message waiting indication, an active call indication, an identification of a certain person calling, an emergency/priority call indication, a device setting, mode or configuration (weekend, office, etc).

14. The device of claim 11, wherein the status indicator can vary the intensity of the color change of the photochromic compound by varying a duty cycle to vary an apparent intensity of the ultraviolet light source upon the photochromic compound.

15. The device of claim 14, where the status indicator provides an indication of at least one selected from the group comprising a volume level, a signal strength, a battery charge level, a number of missed calls, a number of voice-mail messages waiting, a number of messages waiting, an ink level, a memory used level, a memory available, a number of pictures taken, a period of time left, a fuel level, and a distance traveled.

16. The device of claim 7, wherein the device is arranged and constructed so reactions by the photochromic compounds therein are controlled solely by the ultraviolet light sources within the device.

17. The device of claim 16, wherein the device further comprises materials that substantially block ultraviolet light from external sources to the device.

18. A device capable of altering its appearance, comprising:
a housing portion of the device having at least one photochromic compound;
at least one light sensor at least partially within the housing portion; and
an internal ultraviolet source for selectively changing the color of the housing portion;
wherein the device is arranged and constructed to have the photochromic compound in the device to be immune from external ultraviolet sources.

19. The device of claim 18, wherein the housing portion comprises a function button that has a portion that changes color and further changes function in correspondence with a change in color.

20. The device of claim 19, wherein the at least one light sensor enables the corresponding change in function with the change in color.

21. An electronic device, comprising
a housing;
a display lens and a plurality of buttons within apertures of the housing; and
at least one photochromic compound on at least one among the housing, the display lens and the plurality of buttons, wherein exposure to ultraviolet light causes the at least one photochromic compound to change color;
wherein the device is arranged and constructed to have the photochromic compound in the device to be immune from external ultraviolet sources.

22. The electronic device of claim 21, wherein the color change provides greater visibility to at least one among the plurality of buttons, writing on the buttons, the display lens, images on the display lens, and the housing.

23. The electronic device of claim 21, wherein the color change provides less visibility to at least one among the plurality of buttons, writing on the buttons, the display lens, images on the display lens, and the housing.

* * * * *